United States Patent [19]

Kohn

[11] Patent Number: 5,155,816
[45] Date of Patent: Oct. 13, 1992

[54] PIPELINED APPARATUS AND METHOD FOR CONTROLLED LOADING OF FLOATING POINT DATA IN A MICROPROCESSOR

[75] Inventor: Leslie D. Kohn, San Jose, Calif.

[73] Assignee: Intel Corporation, Santa Clara, Calif.

[21] Appl. No.: 742,289

[22] Filed: Aug. 8, 1991

Related U.S. Application Data

[63] Continuation of Ser. No. 309,429, Feb. 10, 1989, abandoned.

[51] Int. Cl.⁵ .................. G06F 13/00; G06F 12/08
[52] U.S. Cl. .................. 395/375; 364/DIG. 1;
   364/231.8; 364/243.4; 364/243.11; 364/240; 395/425
[58] Field of Search .................. 395/375, 775, 425

[56] References Cited

U.S. PATENT DOCUMENTS

| | | | |
|---|---|---|---|
| 3,618,041 | 11/1971 | Tachikawa-shi | 364/200 |
| 3,938,097 | 2/1976 | Niguette, III | 364/200 |
| 4,195,340 | 3/1980 | Joyce | 364/200 |
| 4,345,309 | 8/1982 | Arulpragasom et al. | 364/200 |
| 4,502,110 | 2/1985 | Saito | 364/200 |
| 4,613,935 | 9/1986 | Couleur | 364/200 |
| 4,646,233 | 2/1987 | Weatherford et al. | 364/200 |
| 4,737,931 | 4/1988 | Ishii | 364/900 |
| 4,896,291 | 1/1990 | Gest et al. | 364/900 |
| 4,897,781 | 1/1990 | Chang et al. | 364/200 |
| 4,902,398 | 2/1990 | Homstad | 204/298 |
| 4,949,302 | 8/1990 | Arnold et al. | 364/900 |
| 4,951,195 | 8/1990 | Fogg, Jr. et al. | 364/200 |
| 4,956,806 | 9/1990 | Crowe et al. | 364/900 |

OTHER PUBLICATIONS

Rosenberg, Jerry J., Ph.D., Dictionary of Computers, Information Processing, and Telecommunications, 2nd Edition, 1987, p. 298.

*Primary Examiner*—Kevin A. Kriess
*Attorney, Agent, or Firm*—Blakely, Sokoloff, Taylor & Zafman

[57] ABSTRACT

A microprocessor having a pipelined architecture, an onchip data cache, a floating-point unit, a floating-point data latch and an instruction for accessing infrequently used data from an external memory system is disclosed. The instruction comprises a first-in-first-out memory for accumulating data in a pipeline manner, a first circuit means for coupling data from the external bus to the first-in-first-out memory and a second circuit means for transferring the data stored in the first-in-first-out memory to the floating-point data latch. The second circuit means also couples data from the cache to the first-in-first-out memory in the event of a cache hit. Finally, a bus control means is provided for controlling the orderly flow of data in accordance with the architecture of the microprocessor.

21 Claims, 6 Drawing Sheets

FIG_2

FIG_3

FIG_5A

PFLOAD FIFO

FIG_5B

PFLOAD FIFO

FIG _ 6   PFLD FLOW CHART

PIPELINED APPARATUS AND METHOD FOR CONTROLLED LOADING OF FLOATING POINT DATA IN A MICROPROCESSOR

This is a continuation of application Ser. No. 07/309,429 filed Feb. 10, 1989, now abandoned.

FIELD OF THE INVENTION

This invention relates to the field of semiconductor microprocessors, particularly those processors which are able to access data in an external memory.

BACKGROUND OF THE INVENTION

The present invention covers a pipelined floating-point load instruction which may be implemented within the bus control unit of a microprocessor. The microprocessor utilized with the present invention is the Intel 860 TM Microprocessor, frequently referred to as the N10 TM processor. (Intel is a registered trademark of Intel Corporation).

The N10 processor is a 32/64-bit IEEE compatible floating-point processor, a 32-bit RISC integer processor and a 64-bit 3-dimensional graphics processor. Using a numerics processor optimized for both vector and scalar operations, it represents the industry's first integrated high performance vector processor incorporating over one million transistors and providing about ½ of the performance of the Cray1, all on a single chip.

All processors have some form of load instruction that can access information from either an external memory or an internal data cache. Access to externally stored data is usually made via an external data bus controlled by the internal logic of the processor. The rationale of using a data cache is to provide efficient access to frequently used information, thereby accelerating processing speed. In processors that utilize a data cache, normal load instructions will operate most efficiently if the data information is resident in the onchip cache. That is, if the data is not in the cache there is a penalty in performance when accessing the data.

Typically, when external data is referenced using a normal load instruction it is stored in the cache. The reason for this is that, under normal conditions, data which has just been referenced is very likely to be referenced again in the near future. The data access penalty is minimized by providing the most frequently accessed information in the internal data cache while reserving external memory for seldomly referenced or reused information. It is the principle of locality which makes the data cache a useful tool since programs tend to reference certain data repeatedly in the near future.

A problem arises however, when a processor is required to deal with very large data structures or, in any event, data structures that are much bigger than that which the data cache can normally hold. As an illustration of the difficulty that can arise, a processor is often required to perform a variety of floating-point operations, such as matrix inversion, multiplication, etc., which require manipulation of huge data matrices. In prior art processors when the data is not in the onchip data cache, the processor must freeze execution and request access from external memory. During the time that execution is frozen, the processor is prevented from issuing any new addresses to memory. In other words, the processor must wait for the data for the first operation to arrive from external memory, before continuing its operations. As a result, this type of access to external memory can take six clock cycles or longer. Thus, a substantial delay is introduced into the processing speed of the system when frequent access to external memory is mandated by the size of the data structures involved.

Another problem related to the handling of large data structures arises when the externally accessed data is brought into the processor. As external data is delivered to the processor, it is written into the cache—usually replacing previously resident data. However, it should be remembered that some external data (most commonly in the case of large data structures) is infrequently referenced information, i.e., it is not expected to be reused, while the replaced data in the cache is information that is very likely to be referenced repeatedly in the near future. Therefore, the processor is tossing out data that needs to be reused in favor of data that will in all likelihood only be referenced once. As a consequence, an inordinate amount of time is spent recalling the replaced cache data. This increased accessing time is another reason why prior art processors run at a much slower rate than is achieved by the present invention.

As will be seen, the present invention implements a pipeline structure which is capable of processing memory operations at a much faster rate (essentially at the full bus bandwidth) without any delay of waiting for the processor to generate the next address. By using this pipelined structure, the processor associated with the present invention can continue issuing addresses without having to wait for the arrival of the data from external memory. This capability enhances the presently described microprocessor when compared to prior art processors.

To achieve this performance, the present invention provides a pipelined floating-point load instruction to rapidly access data stored in external memory. This pipelined floating-point load software instruction, which is more easily referred to as "PFLoad" or "PFld", may be used by a programmer to access data which is stored either in the onchip data cache or in an external memory system. The instruction is optimized for the situation in which the data is not already residing with the processor's internal data cache. This situation is referred to as a "cache miss" or, phrased alternatively, a "PFLoad miss". The opposite case in which the data that is to be loaded is already stored within the data cache—called a "cache hit"—is also handled by the present invention.

Additionally, the PFLoad instruction of the present invention does not replace data already resident within the data cache, but rather directs the newly accessed data to a storage location within the floating point unit of the processor. The PFLoad instruction will be discussed in conjunction with its current implementation in the bus control unit of the N10 processor.

SUMMARY OF THE INVENTION

A specialized microprocessor instruction optimized for accessing floating-point data stored in an external memory system is described. The invention utilizes the pipelined architecture of the microprocessor to efficiently retrieve external data that is unlikely to be reused again in the near future; transferring the data directly to a floating-point data latch. Frequently referenced data resident in the onchip data cache remains undisturbed.

The pipelined floating-point load instruction of the present invention includes a first-in-first-out (FIFO)

memory for accumulating the accessed data. In conjunction with the FIFO, a first circuit means is provided for delivering the data from external memory to the FIFO, and a second circuit means is provided for transferring the data from the FIFO to the floating-point data latch. The second circuit means also couples data from the data cache back to the FIFO in the event of a cache hit (i.e., the referenced data actually resides in the data cache). Finally, a bus control means is provided, coupled to the first and second circuit means, for controlling the pipelined flow of data from the external memory system to the floating-point unit.

One object of the present invention is to provide a pipelined instruction which is capable of processing memory operations at a much faster rate than prior art processors. As such, the present invention can continue issuing addresses without having to wait for the arrival of the actual data from external memory.

Another object of the present invention is to provide access to external data without replacing data already resident in the onchip data cache. By doing so, the present invention minimizes total accessing time; thereby increasing operation speed.

A further object of the present invention is to provide an efficient and fast means for handling arithmetic operations involving very large data structures.

BRIEF DESCRIPTION OF THE DRAWINGS

The present invention will be understood more fully from the detailed description given below and from the accompanying drawings of the preferred embodiment of the invention, which, however should not be taken to limit the invention to the specific embodiment but are for explanation and understanding only.

DETAILED DESCRIPTION OF THE INVENTION

A microprocessor comprising a pipelined floating-point load instruction for loading of data from external memory is described. In the following description, numerous specific details are set forth, such as bit lengths, etc., in order to provide a thorough understanding of the present invention. It will be obvious, however, to one skilled in the art that these specific details need not be used to practice the present invention. In other instances, well-known structures and circuits have not been shown in detail in order not to unnecessarily obscure the present invention.

Figure 1:
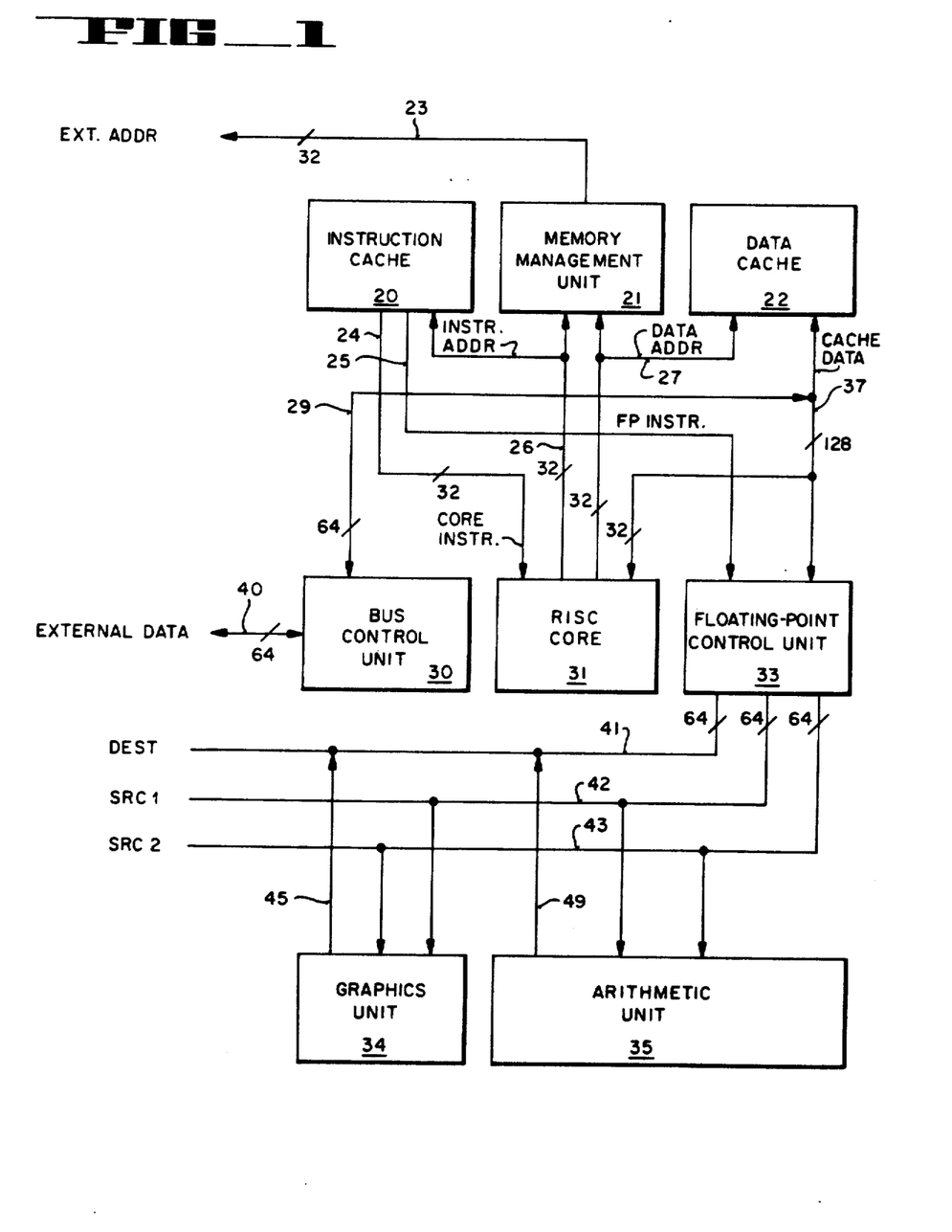
FIG. 1 illustrates the logical partitioning of the processor associated with the pipelined floating-point load instruction of the present invention.

Referring to FIG. 1 a partitioned view of the N10 processor is shown. The N10 processor is logically and physically divided into eight separate units.

The arithmetic unit 35 comprises a floating-point adder unit which supports IEEE standard double and single precision addition, and a floating-point multiplier unit, also supporting IEEE standard single and double precision floating-point multiplication. Both the adder and multiplier units have 3-stage pipeline capability. During operation, the input operands represented by mnemonics src1 and src2 are presented to the arithmetic unit 35 along lines 42 and 43, respectively. The mnemonics src1 and src2 (as well as dest) denote one of the 32 floating-point registers located within the N10 processor. The result output from arithmetic unit 35 appears on line 49 which is coupled to 64-bit destination bus 41. Buses 41-43 are each 64-bits in length and are coupled to floating-point control unit 33. Floating-point source operands src1 and src2 are also provided to graphics unit 34.

Graphics unit 34 is a 64-bit graphics processor providing high speed 3-dimensional graphics and pixel calculation for different shading algorithms and z-buffer check for hidden surface elimination. The graphics processor is capable of merging the results of several operations and for providing a result along line 45 to destination bus 41.

The instruction cache 20, also referred to as the I-unit, supplies 32-bit integer and a 32-bit floating-point instructions to both the RISC core 31 and the floating-point control unit 33, along lines 24 and 25, respectively. The instruction cache is a two-way set-associative memory of four K-bytes, with 32-byte blocks. The instructions are provided by cache 20 in each clock to the respective buses.

Memory management unit 21 performs the translation of the virtual address to the physical address for data and instruction access, checks for access violation and compares the physical addresses of the current cycle to the previous cycle for generation of the next nearest signal all in one clock. The translation is done using a translation-look-aside buffer (TLB) which is an associative cache with 64 entries. Memory management unit 21 recieves its inputs along 32bit buses 26 and 27, output from RISC core 31.

RISC core 31, also referred to as the execution core or E-unit, performs all 32-bit integer and load/store operations. It is the central controller of the N10 processor. It has a 3-port register file with 32-bit registers, a bypass network, a shifter, an ALU and the instruction pointers. Core unit 31 fetches both integer and floating-point instructions. It contains the integer register file, and decodes and executes load, store, integer, bit, and control-transfer operations.

Data cache unit 22 provides data caching and byte alignment for the read/write operations of the N10 processor. The cache data exchange is provided between data cache 22 and floating-point control unit 33 through bus 37. The data cache 22 may also receive external data through the bus control unit 30 on 64-bit bus 29.

Bus control unit 30 (also referred to as the B-unit) is the bus cycle controller which interfaces between the external bus and the internal chip. It gets bus cycle requests from the E-unit, performs the data and instruction caches access, handles cache miss cases including freeze control and cache line replacement, controls the TLB translation, miss and fault processing and provides the interface to the external bus. The pipelined floating-point load instruction which is the subject matter of the present invention, is implemented within bus control unit 30 of the N10 processor. The bus controller has a pipelined architecture that allows up to three outstanding bus cycles.

In the architecture of many modern microprocessors, pipelining is used to increase the rate at which operations may be introduced or performed. The pipelined architecture treats each operation as a series of more primitive operations (called stages) that can be executed in parallel. In the N10 processor, the number of pipeline stages may range from 1-3. A pipelined operation with a 3-stage pipeline stores the result of the third prior operation. A pipelined operation with a 2-stage pipeline stores the result of the second prior operation. A pipelined operation with a 1-stage pipeline stores the results of a prior operation. The N10 processor supports 3-level bus cycle pipelining on the external bus, so there may be up to 3 bus cycles issued before the data for the first cycle has returned. Additionally, the internal address path in the B-unit is pipelined in such a way that the address translation for the next cycle is done in parallel with the current external bus cycle.

As previously mentioned, the PFLoad instruction is used to access infrequently used data, i.e., data that is not expected to be reused in the near future, from external memory. As such, the PFLoad control logic which resides within the bus control unit, is optimized for the case of a cache miss. A "cache miss" refers to the situation in which PFLoad data is not already resident within the data cache unit.

Figure 2:
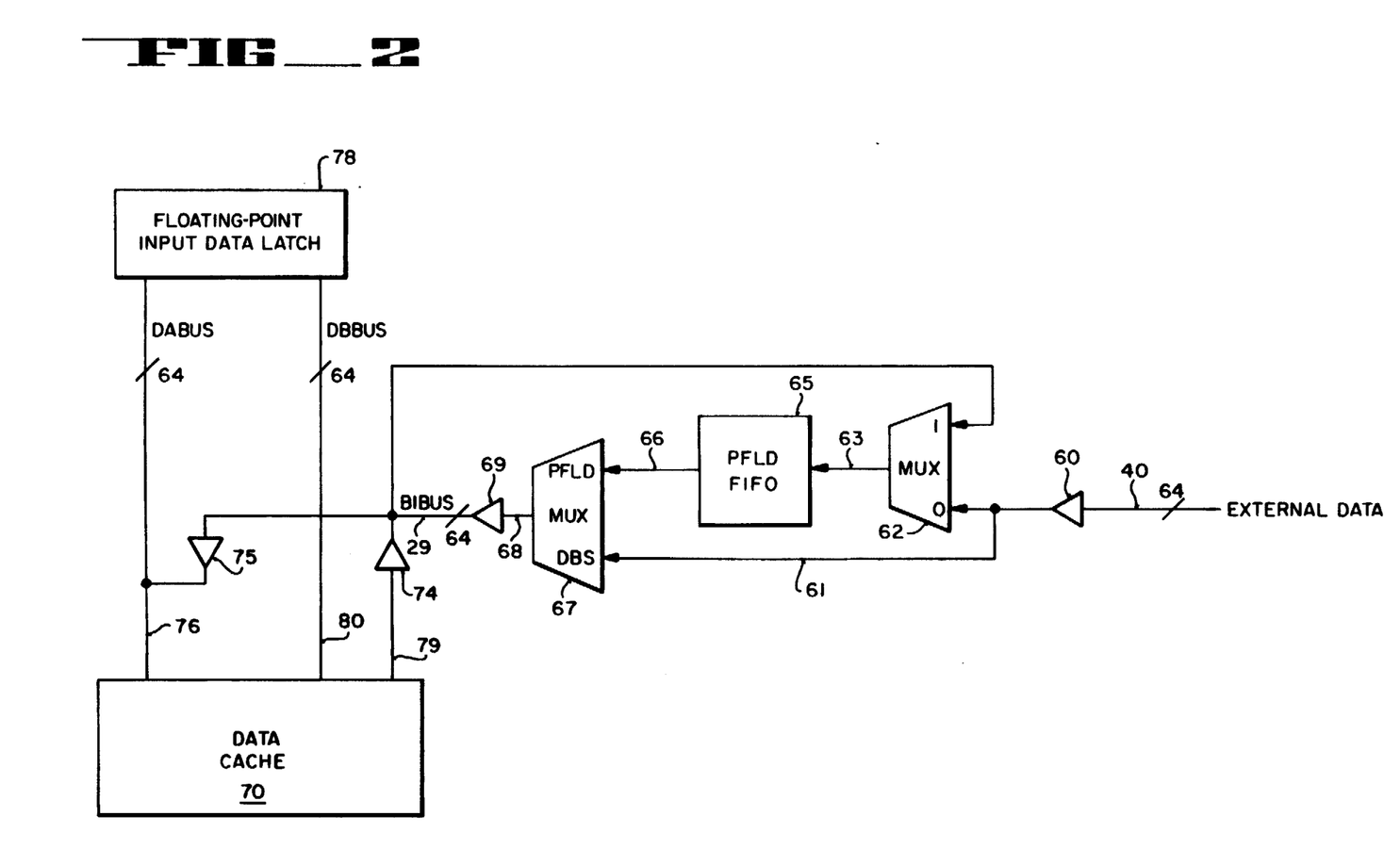
FIG. 2 shows the currently preferred embodiment of the pipelined floating-point load instruction of the present invention.

FIG. 2 shows a preferred embodiment of the instruction of the present invention. The PFLoad instruction returns data from external memory along 64-bit bus 40. The returned data is the data that was addressed by the third previous PFLoad instruction in accordance with the pipelined nature of the N10 processor. Tri-state buffer 60 is used to drive the external data to the "0" input of MUX 62 and also to the DBS input of MUX 67. Buffer 60 is coupled to multiplexer 62 and 67 through line 61. Buffer 60, as well as drivers 69, 74 and 75, comprise ordinary tri-state logic drivers. Similarly, multiplexers 62 and 67 comprise ordinary logic circuitry as used in the preferred embodiment. Control for tri-state drivers 60, 69, 74 and 75, as well as multiplexer 62 and 67, is provided by bus control logic within the B-unit. This control logic has been synthesized by a computer from a high-level, functional language description of the bus control unit. A flow chart of the control operations provided by the B-unit is discussed later.

The implementation of the PFLoad instruction also includes a PFLoad first-in-first-out (FIFO) memory 65 coupled from the output of multiplexer 62 on line 63. FIFO 65 produces an output along 66 which is coupled to the PFLoad input of MUX 67.

In the currently preferred embodiment, FIFO 65 is 64-bits long and, 3 words deep. PFLoad FIFO 65 contains the 64-bit data referenced by the three previous PFLoad instructions. When the processor is initialized, or following a reset, the contents of the FIFO are undefined. Consequently, unuseable data or garbage is returned for the first three PFLoad instructions (programmers must ignore the data returned for the first three PFLoad instructions issued).

Multiplexer 67 has one input for receiving data output from the top of FIFO 65 and another input for receiving data directly from external memory. External data is directly delivered to MUX 67 via line 61. FIFO 65 is connected to MUX 67 by line 66. The output of MUX 67 appears on line 68 which is coupled to tri-state buffer 69. Tri-state bus buffer 69, in turn, is coupled to a 64-bit internal bus called a BIBUS, which is shown in FIG. 2 as line 29. As its name indicates, this bus is bi-directional, delivering data to the floating-point unit as well as returning data from the cache to MUX 62. BIBUS 29 is coupled to DABUS 76, also 64-bits in length, through buffer 75. DABUS 76 connects floating-point input data latch 78 to data cache 70. As previously mentioned, BIBUS 29 is bi-directional to allow the return of data already residing in data cache 70 to MUX 62 in the event of a cache hit. Data in the cache is coupled to the BIBUS along line 79 through buffer 74.

When the N10 processor needs to access data, that data may either be found in an external memory system or within the internal data cache. When the data is external to the N10 processor, the PFLoad instruction acts to load data from external memory, using external bus 40, through multiplexer 62 into PFLoad FIFO 65. After three successive PFLoad instructions have been issued (corresponding to successive FIFO stages), the initial data is produced on line 66; thereafter delivered onto BIBUS 29. After the FIFO is full, each normal PFLoad cycle transfers the data from the top of the FIFO to BIBUS 29, and then to floating-point input data latch 78 via DABUS 76. Thus, each normal PFLoad cycle initiates a corresponding read cycle within the processor.

As new data arrives from the external data bus it is normally directed to the bottom of FIFO 65. However, if the addressed data already resides in the data cache, a PFLoad hit (synonymous with a cache hit) occurs and an exception is generated. When a PFLoad hit occurs, the bus control logic of the B-unit will wait until all outstanding bus cycles are complete. Next, it transfers the requested data from data cache 70 to the bottom of the FIFO 65 along the data path provided by line 79, buffer 74, BIBUS 29 (coupled to the "1" input of MUX 62) and line 63.

The controller must wait for all outstanding bus cycles to be complete before transferring the PFLoad hit data from data cache 70 to the bottom of FIFO 65 for two reasons. First, there may be a PFLoad cycle outstanding. Any attempt to write the PFLoad hit data into the FIFO before all outstanding PFLoad cycles are completed will cause the data in the FIFO to be out of order. Secondly, BIBUS 29 may already be occupied with data that is being transferred from a third previous PFLoad instruction to the floating-point unit. Bus contention would result if the PFLoad hit data from the cache is transferred immediately across the BIBUS. To prevent bus contention from occurring, the bus control logic of the B-unit shuts off buffer 74 for one extra clock before putting data back into FIFO 65. After the B-unit waits for all outstanding cycles to be completed, PFLoad hit data is then placed in the bottom of the FIFO and PFLoad processing proceeds as normal.

It is possible for the processor to operate at a faster rate than the external bus or memory. For instance, if the speed of the processor is faster than the external hardware, the FIFO may be emptied. The FIFO is required to have a sufficient number of stages to hold the maximum number of addresses issued by the processor and also be compatible with the pipelined architecture of the processor. Therefore, it is appreciated that the presently described PFLoad instruction operates dynamically.

Figure 5A:
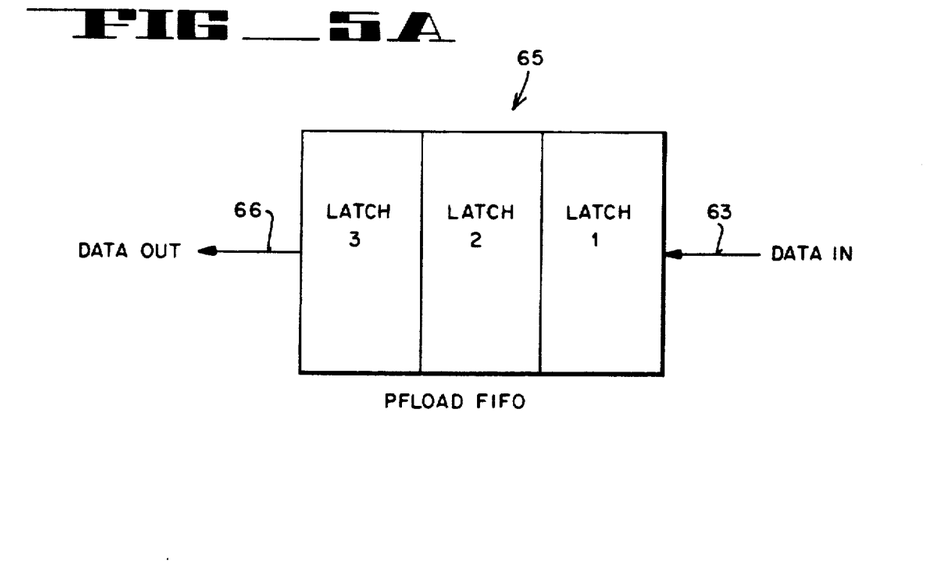
FIG. 5a illustrates one embodiment of the pipelined floating-point load first-in-first-out memory incorporated in the present invention.
Figure 5B:
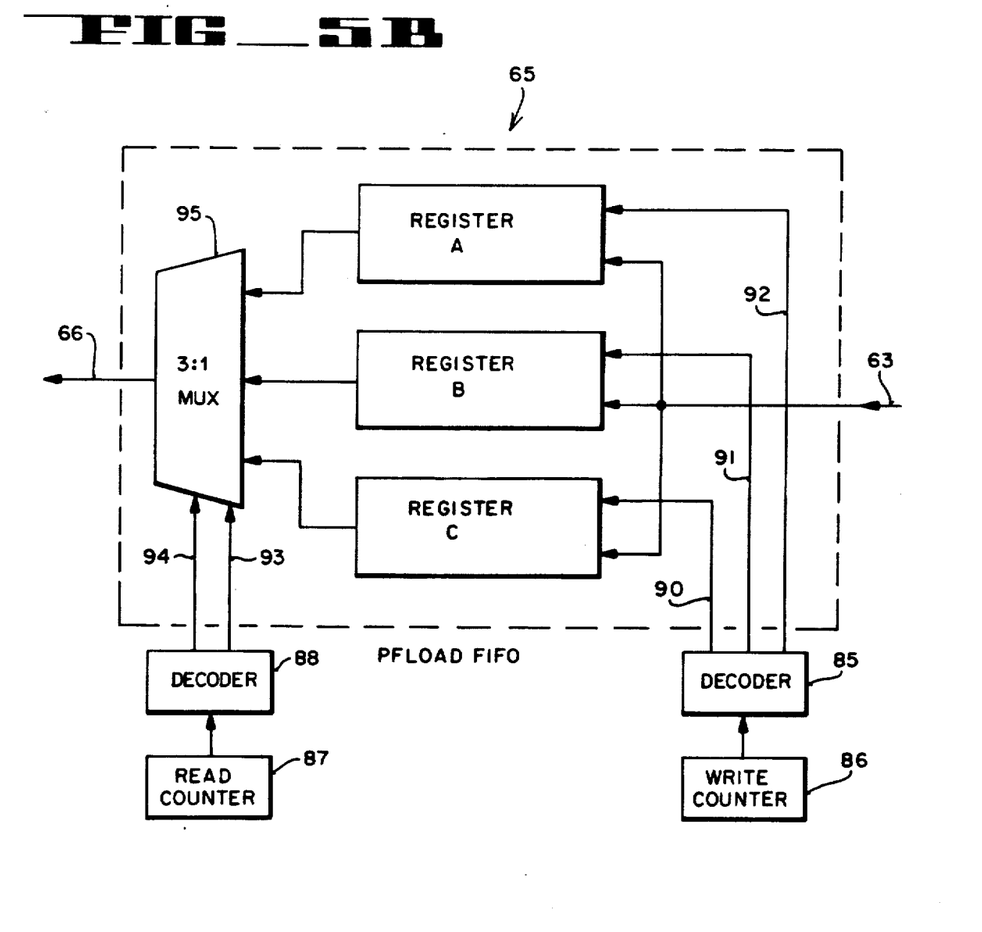
FIG. 5b shows the currently preferred embodiment of the first-in-first-out memory incorporated in the present invention.

Referring now to FIG. 5b, the PFLoad FIFO 65 is implemented in the currently preferred embodiment with three latches or registers per bit, a read position counter 87, and a write position counter 86. The read positon counter is coupled to decoder 88 which, in turn, is coupled to 3:1 MUX 95 through lines 94 and 93. These lines are coupled to the select lines of MUX 95 such that, during PFLoad operation, read counter 87 selects the register from which the next PFLoad cycle will read data.

Write position counter 86 is coupled to decoder 85 which, in turn, is coupled to registers A, B, and C on lines 92, 91, and 90, respectively. Lines 90–92 permit data appearing on line 63 to be latched into the appropriate register. In operation, write position counter 86 points to the latch to which the next PFLoad cycle will write the returned data. Both the read position and write position counters comprise ordinary 0-to-2 wrap around counters.

The read counter is incremented when a PFLoad instruction is in the write back stage or pending, the BIBUS is not busy and the PFLoad FIFO is not empty. If the FIFO is empty, the read counter is incremented although the data is not actually latched in the FIFO but is directly driven to the floating-point input data latch. The write counter is incremented when the current external bus cycle is a PFLoad or when PFLoad data is being written from the data cache into the bottom of the FIFO for a PFLoad hit. The two bits of the write position counter are used to generate the FIFO write signals which latch the data into the FIFO.

An alternative embodiment of FIFO 65 is shown in FIG. 5a. FIG. 5a shows a FIFO in which the data passes serially from latch 1, to latch 2, and finally to latch 3 before being output on line 66. Although the FIFO of FIG. 5a adequately preserves the pipeline nature of the PFLoad instructions, it does not have the flexibility of the FIFO shown in FIG. 5b. For example, in the FIFO of FIG. 5b, data could be written into latch 87 in one clock cycle and read out in the following cycle without having to pass through the other registers. Thus, certain data may be made available earlier if necessary.

As previously stated, the N10 processor can issue up to three outstanding bus cycles. If the processor is issuing bus cycles at a rate faster than that of the external memory, the PFLoad FIFO can be emptied. This implies that the three outstanding cycles are PFLoad cycles. If a fourth PFLoad cycle is in the write back stage and there is no data available to load into data latch 78, the bus controller unit issues a freeze. When a PFLoad cycle is requested but the FIFO is empty, the core must be frozen until the PFLoad data is available on the DABUS. (A PFLoad is pending when the data from the FIFO cannot be transferred to data latch 78 due to the PFLoad FIFO being empty, BIBUS is busy, or a translation-look-aside buffer miss.)

It should be noted that when the data cache is doing a normal read, the data cache unit 70 drives both DABUS 76 and DBBUS 80, so that it becomes impossible to supply external data to the latch in the same clock cycle. However, in using a PFLoad instruction, data cache 70 is controlled by the B-unit logic such that the cache's internal drivers (which are connected to DABUS 76) are turned off. By turning off the cache drivers to DABUS 76, external data can be supplied to data latch 78 without creating a bus contention situation.

Once PFLoad data becomes available on DABUS 76, the freeze is lifted. External data is then driven by buffer 75 onto the DABUS from BIBUS 29. The data supplied along the BIBUS may originate either from FIFO 65 or directly along line 61 from the external memory system. MUX 67 selects line 61 as the source of the data only when FIFO 65 is empty. Whether the FIFO 65 is empty depends on the speed of the external memory, how often the programmer issues PFLoad instructions, etc. If the PFLoad sequence is interrupted, then the data will continue to be delivered from external memory so long as there are outstanding PFLoad commands issued on external bus 40. The external data referenced by the previous PFLoad instructions then accumulates in FIFO 65 until the programmer once again starts issuing PFLoads.

If the programmer issues successive PFLoad commands such that the data FIFO 65 is emptied before any outstanding PFLoad cycles have been completed, new data arriving on external data bus 40 will be coupled along line 61 through MUX 67 to be supplied directly to BIBUS 29. Next, the data supplied on BIBUS 29 is sent by buffer 75 onto DABUS 76 to eventually end up stored in floating-point input data latch 78. The data input latch is actually part of the floating-point unit of the N10 processor. (The DBBUS is only used when processing 128-bit loads. Since the PFLoad instruction only operates on 64-bit or 32-bit loads the DBBUS is not directly related to the PFLoad instruction of the present invention.)

When a data cache hit occurs, i.e., the data requested actually resides within the data cache and not external memory, then the following events take place. First, the present word of data has to be returned either from PFLoad FIFO 65 or from the external data bus 40. To accomplish this buffer 75 is shut off by the control logic of the bus control unit and the data is returned along the BIBUS path which terminates at the "1" input of multiplexer 62. Multiplexer 62, which is also controlled by the Bus control unit, then returns the data to the bottom of FIFO 65 along line 63.

In the case where a number of outstanding PFLoads have been issued—none of which have yet returned data from external memory—and a cache hit occurs, a different scenario is presented. In this situation there is nothing that the processor can immediately do with the word of data presently residing in the data cache. The bus control unit must first wait for all previously issued PFLoad instructions to return data from external memory. The first word of data returned is transferred, either from FIFO 65 or directly from the external bus, into data input latch 78 while the remaining two words are written to FIFO 65. Finally, the word of data stored in data cache 70 is transferred to FIFO 65 as the last word in the FIFO. Thus, there is a substantial time penalty in the case of a cache hit since the programmer must wait for all outstanding PFLoad cycles to be completed before transferring the data from the cache to the FIFO. It should be obvious from the foregoing discussion that the PFLoad instruction is optimized for a cache miss rather than a cache hit.

Figure 4:
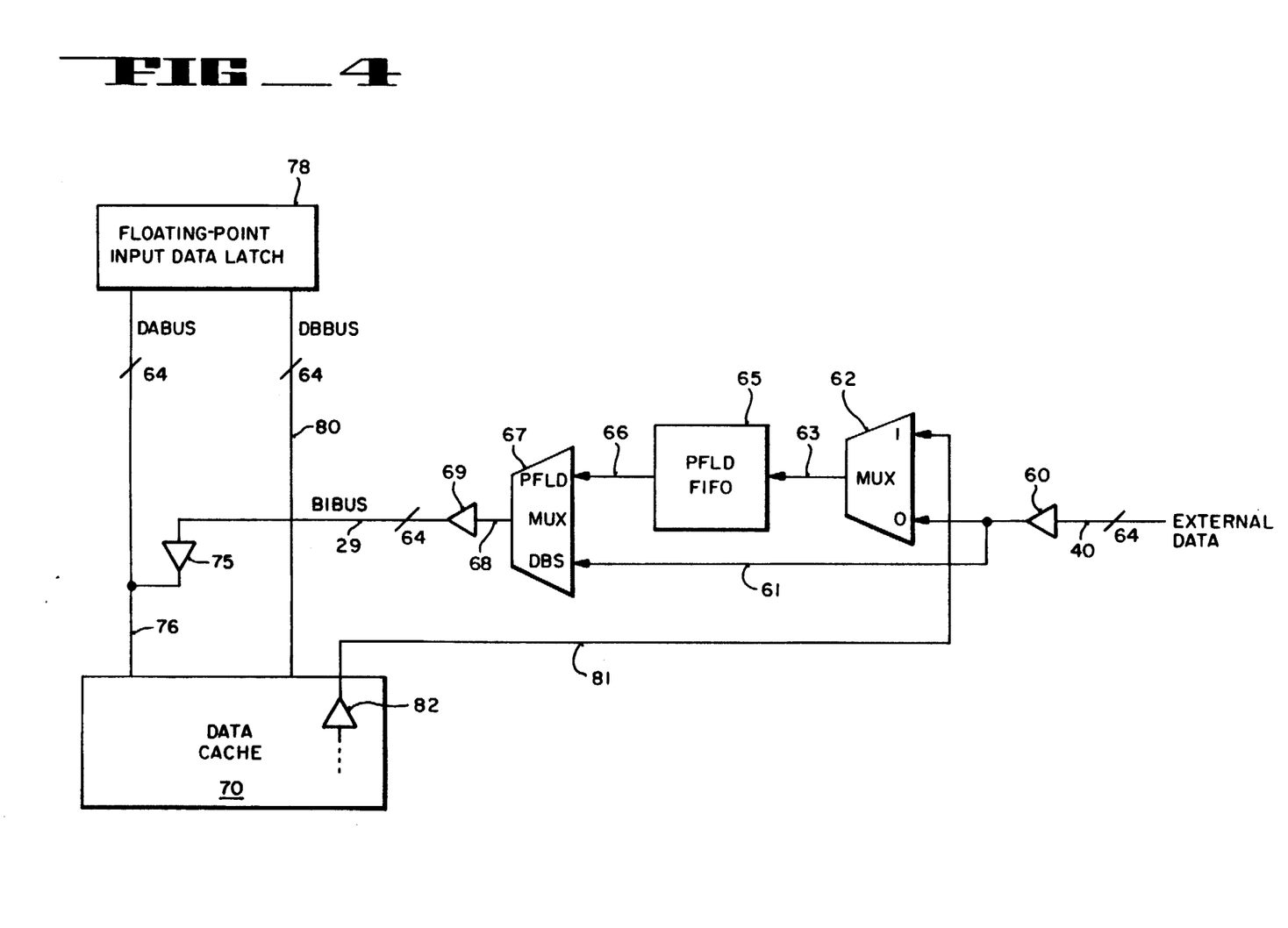
FIG. 4 shows an alternative embodiment of the present invention.

With reference to FIG. 4, an alternative embodiment of the present invention is shown. The circuit of FIG. 4 is identical to FIG. 2, except that line 79, buffer 74 and the return BIBUS path to the "1" input of MUX 62 have been eliminated. In their place, bus 81 has been included. Bus 81 is coupled from the internal buffer 82 of cache 70 directly to the "1" input of multiplexer 62. The primary benefit realized by this alternative embodiment is that the user does not have to wait for buffer 69 to turn off before writing data into FIFO 65. Because there is a dedicated bus 81 included to accomodate a cache hit, the programmer also does not have to wait for all of the external data from outstanding PFLoad instructions to be returned before proceeding. Nor is there an additional clock penalty since the data is supplied directly from data cache 70 to FIFO 65 when a cache hit occurs.

On the other hand, the preferred embodiment of FIG. 2 enjoys the advantage of a reduced silicon area since only a single bus is required; whereas, in the alternate embodiment of FIG. 4, additional bus 81 is needed.

Figure 6:
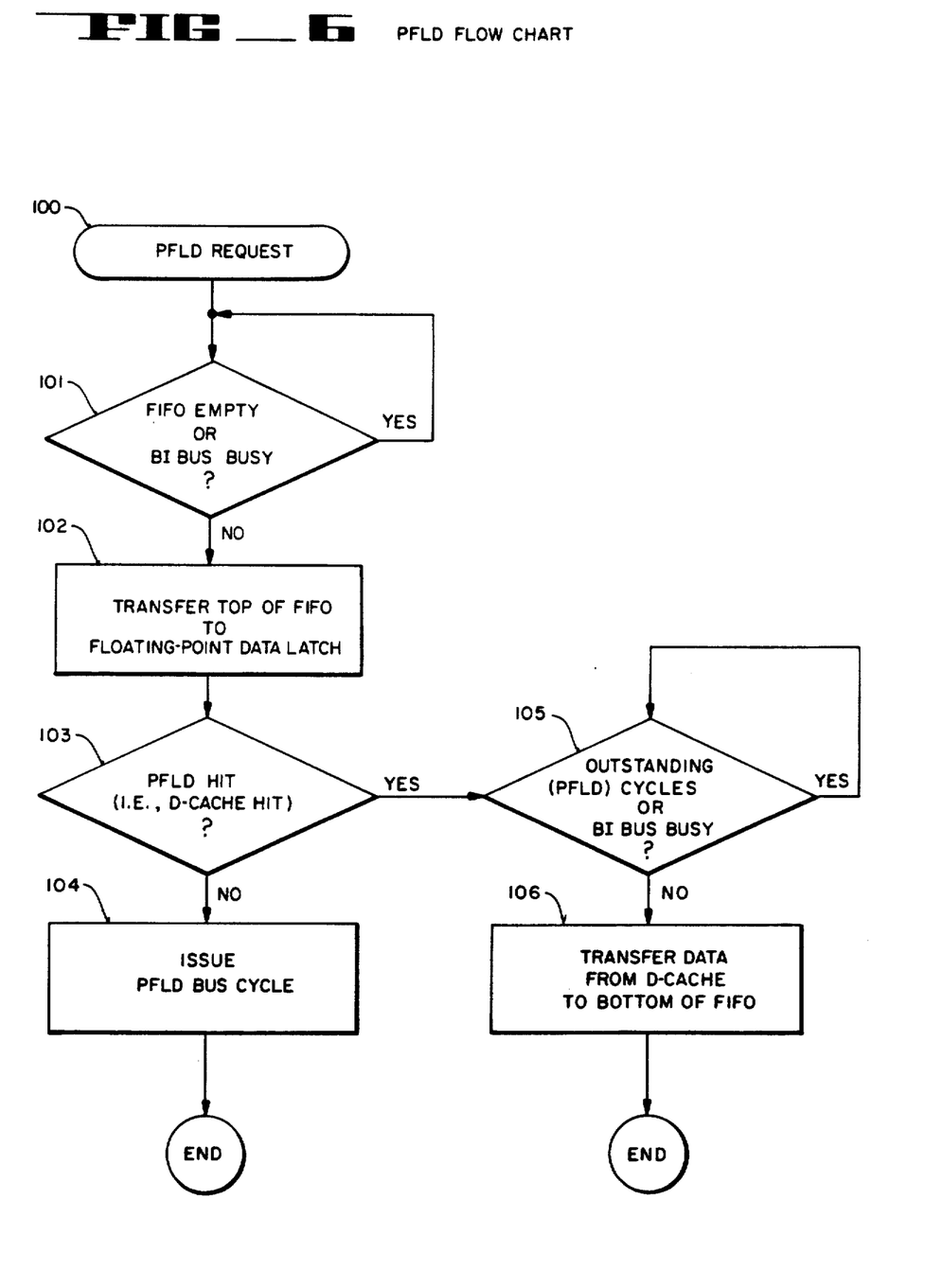
FIG. 6 is a flow chart depicting the control operations provided by the bus control logic associated with the PFLoad instruction of the present invention.

FIG. 6 shows a flow chart depicting the control operations provided by the bus control logic associated with the PFLoad instruction of the present invention. This flow chart summarizes the foregoing description of the bus control logic exerted during the execution of the PFLoad instruction. Referring to FIG. 6, the PFLoad chart begins with state 100 representing a PFLoad request. Once a request has been issued the bus control logic and the B-unit must determine whether FIFO 65 is empty or BIBUS 29 is busy. This is shown by decision element 101. If either of those two conditions is true, the bus controller will wait until the condition changes. If there is data present in the FIFO and the BIBUS is not busy, then the controller passes to state 102 in which data residing in the FIFO is transferred to the floating-point data latch 78. In decision state 103 the bus controller checks to see whether or not a PFLoad hit, or alternatively phrased a data cache hit, has occured. If the data resides in external memory and not in data cache 70 then the bus controller will issue a PFLoad bus cycle as shown by state 104. Processing proceeds as normal until the end of the instruction is reached.

Alternatively, it may happen that a PFLoad hit does occur in which the bus controller logic must query whether there are any outstanding PFLoad cycles or whether or not the BIBUS is busy. This is shown in FIG. 6 by decisional point 105. If there are outstanding cycles, or the BIBUS is busy, the bus controller logic must wait until all outstanding bus cycles are complete and the BIBUS is available for transfer of data. When this occurs data is then transferred from the data cache to the bottom of the FIFO as shown by state 106. The transfer may occur as described in conjunction with FIG. 2 wherein the data passes along line 79 through buffer 74 to be returned by the BIBUS to the one input of MUX 62. In the alternative embodiment, data from the data cache 70 passes directly along line 81 to the "1" input of MUX 62. Once again, operation proceeds as normal until the end of the instruction is reached.

Figure 3:
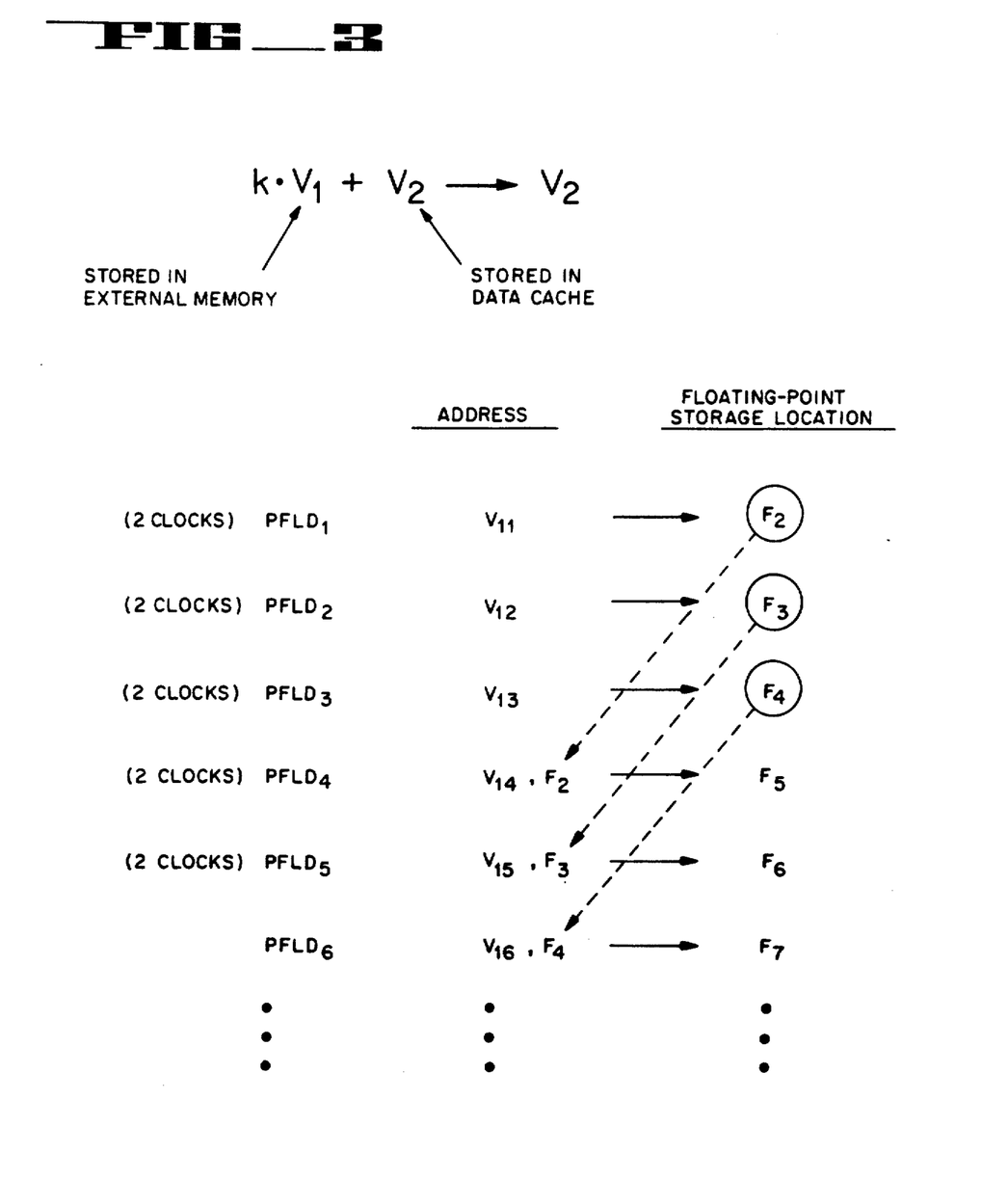
FIG. 3 illustrates a series of pipelined floating-point load instructions which have been issued for a typical operation involving a vector matrix stored in external memory and an internal vector stored in the onchip data cache. The addresses associated with each pipelined floating-point load instruction and their associated floating-point storage locations are provided.

In order to more fully appreciate the operation and advantages of the present invention, reference is now made to the sample operation given in FIG. 3. The sample operation shown by the equation of FIG. 3 is:

$$kV_1 + V_2 \rightarrow V_2$$

where k is a certain predetermined constant, $V_1$ is one of 1000 different, 1000 element, vectors stored in external memory and $V_2$ is a vector stored internally in data cache unit 70. For this particular calculation, the processor must reuse vector $V_2$ a thousand times (once for each of the individual elements of each $V_1$) while the individual elements of $V_1$ are used only once. Utilizing the PFLoad instruction of the present invention, the processor loads the individual elements of vector $V_1$ into the floating-point register without writing over any $V_2$ data resident in the data cache.

FIG. 3 shows a first PFLoad instruction, $pfld_1$, being issued to the address of $V_{11}$ in order to load the first element of the first $V_1$ vector into floating-point storage location $f_2$. The $pfld_1$ command takes two clock cycles to initiate. Without waiting for the data to return from external memory, a second PFLoad instruction, $pfld_2$, is issued to address vector element $V_{12}$ and directs it to floating-point storage location $f_3$. Additional PFLoad commands are initiated for vector elements $V_{13}$, $V_{14}$, $V_{15}$, etc. A new PFLoad can be requested every two clocks since the external bus permits a new address to be issued every two clocks.

When the fourth PFLoad command is issued, i.e., $pfld_4$, external memory begins to return the data from the first PFLoad instruction. This returned data actually corresponds to the third previous PFLoad instruction so that the destination register specified in the fourth PFLoad is the $f_2$ register. The arrival of the data from the third previous PFLoad command is shown by the dashed lines and arrows directed diagonally from the floating-point storage location to the address of the PFLoad command. The programmer may continue to specify PFLoads every two clocks in accordance with the full bandwidth capability of the external bus. In practice, there is a total of six clocks of latency from the time that the programmer specifies the data address to the time that data returns. So the memory system has a total of 6 clocks to provide the data even though a new bus cycle is starting every other clock. This means that a 3×speed increase in the rate in which cycles can be processed is realized. Without the pipeline approach, the programmer would be restricted to issuing a new cycle every six clocks instead of every other clock.

It should be understood, of course, that the foregoing discussion assumes that each PFLoad instruction corresponds to a data cache miss. If this was a normal floating-point load in a prior art processor, as soon as the programmer tried to perform a second PFLoad the bus control unit would respond that there is an outstanding access and then freeze up for the entire six clocks—waiting for outstanding bus loads to return. Therefore, in a prior art processor the programmer can only issue a new address every six clocks instead of every other clock. Thus, the pipeline approach associated with the PFLoad instruction of the present invention allows the user to issue addresses at a faster rate, despite the fact that the data is not resident in the onboard cache. It therefore allows efficient processing and accessing of very large data structures.

The present invention allows the vector $V_2$ to be stored onboard while the V1 element is kept in external memory so that the user may reference V1 elements using a PFLoad instruction and reference V2 with a normal load instruction. In a typical prior art microprocessor without a PFLoad instruction, each time the user references V1, data elements would be brought into the cache thereby forcing out the elements of vector V2. This would create additional delay the next time the V2 element would have to be loaded.

Whereas many alternations and modifications of the present invention will no doubt become apparent to a person of ordinary skill in the art after having read the foregoing description, it is to be understood that the particular embodiment shown and described by way of illustration is in no way intended to be considered limiting. For example, although this disclosure has shown a particular way of implementing the pipeline floating-point load instruction, other implementations are possible. Therefore, reference to the details of the preferred embodiment are not intended to limit the scope of the claims which are themselves recite only those features regarded as essential to the invention.

Thus, a pipelined floating-point load instruction for accessing infrequently referenced data from external memory has been described.

I claim:

1. In a microprocessor having a pipelined architecture, a data cache coupled to a floating-point unit along an internal bus, and a bus control unit which controls access to an external memory along an external bus, an apparatus for controlling the pipelined loading of floating-point data in said microprocessor comprising:
   a first circuit means for storing floating-point data in a piplined manner as it is received from said external memory;
   a bi-directional bus coupling said first circuit means to said internal bus, said bi-directional bus transferring the floating-point data stored in said first circuit means to a floating-point data latch via said internal bus; and
   control means for controlling said first circuit means and said data cache so that floating-point data previously stored in said first circuit means may be pipelined to said floating-point data latch without contention of said internal bus by said data cache, and further wherein floating-point data received by said first circuit means is not otherwise written into said data cache.

2. The apparatus of claim 1 wherein said first circuit means comprises an N-stage buffer, where N is an integer greater than 1, coupled to said external bus for delivering data from said external memory to said floating-point unit, but not to said data cache.

3. The apparatus according to claim 2 wherein a separate data address associated with said external memory may be issued for each successive cycle of said external bus thereby providing increased accessing speed to said external memory.

4. The apparatus according to claim 3 wherein floating-point data residing in said cache is returned to said N-stage buffer along said bi-directional bus through a second buffer under the control of said control means whenever a cache hit occurs.

5. The apparatus according to claim 4 wherein said first circuit means comprises:
   a first multiplexer having one input coupled to said external bus, another input coupled to said bi-directional bus and an output;
   an N-stage first-in-first-out (FIFO) memory having an input and an output, said input being coupled to said output of said first multiplexer;
   a second multiplexer having one input coupled to said output of said FIFO memory, another input coupled to said external bus and an output, said output of said second multiplexer being coupled to said bi-directional bus through a third buffer;
   said first multiplexer providing data to said FIFO memory either from said external memory in the event of a cache miss or from said data cache in the event of a cache hit; and
   said second multiplexer providing data to said bi-directional bus from said FIFO memory, or directly from said external bus.

6. The apparatus according to claim 5 wherein said bi-directional bus is coupled to said internal bus through a fourth buffer, said fourth buffer and said data cache being controlled by said control means such that said data cache is denied access to said internal bus when said bi-directional bus is transferring data to said data latch, thereby avoiding bus contention.

7. The apparatus according to claim 6 wherein each of said buffers comprises a tri-state buffer.

8. In a microprocessor having a pipelined architecture, said microprocessor comprising a data cache coupled to a floating-point data latch along an internal bus, an apparatus for pipelined accessing of floating-point data from an external memory across an external bus comprising:
   a memory means for accumulating floating-point data;
   a first circuit means for delivering floating-point data from said external memory to said memory means, but not to said data cache, when a cache miss occurs;
   a second circuit means for delivering the floating-point data accumulated in said memory means to said data latch, said second circuit means also coupling said data latch to said first circuit means such that floating-point data resident within said data cache is returned to said memory means in the event of a cache hit; and
   a bus control means coupled to said first and second circuit means, said memory means, said internal bus and said data cache for controlling the pipelined flow of floating-point data from said external memory to said data latch without contention of said internal bus by said data cache in the event of a cache miss, and for controlling the return of floating-point data from said data cache to said memory means in the event of a cache hit.

9. The apparatus of claim 8 wherein said memory means comprises an N-stage first-in-first-out (FIFO) memory, where N is an integer.

10. The apparatus according to claim 9 wherein said first circuit means comprises a first multiplexer and a first buffer, said first buffer coupling said external bus to one input of said first multiplexer, said first multiplexer having another input coupled to said second circuit means and an output coupled to said FIFO memory.

11. The apparatus according to claim 10 wherein said first buffer also couples said external bus to said second circuit means such that floating point data may be transferred directly to said data latch from said external memory whenever said FIFO memory is empty.

12. The apparatus according to claim 11 wherein said second circuit means comprises a second multiplexer having an output, one input coupled to receive pipelined floating point data from said FIFO memory, and another input coupled to said first buffer,
   said second circuit means further comprising a second buffer coupled to said output of said second multiplexer and also to a bi-directional bus for delivering floating-point data to said data latch in the event of a cache miss and returning floating-point data from said data cache to said another input of said first multiplexer in the event of a cache hit.

13. The apparatus according to claim 12 wherein said FIFO memory comprises:
a plurality of registers;
a first selection means for selecting which of said plurality of registers floating-point data is to be written to; and
a second selection means for determining which of said plurality of registers floating-point data is to be read from.

14. The apparatus according to claim 13 wherein said apparatus can issue addresses to said external memory at the full bandwidth of said external bus, and wherein said apparatus returns the Nth previous floating-point data element each clock cycle.

15. In a processor having a pipelined architecture, a data cache coupled to a floating-point unit along an internal bus, and a bus control unit which controls access to an external memory along an external bus, an apparatus for controlling the pipelined loading of floating-point data into said processor comprising:
a first buffer coupled to said external bus for receiving floating-point data from said external memory;
a first circuit means for storing floating-point data in a pipelined manner as it is received from said external memory by said first buffer;
a first bus coupled to said first circuit means and to said internal bus for transferring the floating-point data stored in said first circuit means to a floating-point data latch in the event of a cache miss;
a second bus coupling said data cache to said first circuit means such that floating-point data residing in said cache is returned to said first circuit means when a cache hit occurs; and
a control means for controlling said first buffer, said first circuit means, said first, second and internal buses, and said data cache such that floating-point data received from said external bus is not written directly into said data cache, but wherein floating-point data previously stored in said first circuit means is pipelined to said data latch along said first and internal buses without contention of said internal bus by said data cache when a cache miss occurs, floating-point data being returned to said first circuit means from said data cache along said second bus in the event of a cache hit.

16. The apparatus according to claim 15 wherein said first circuit means comprises:

a first multiplexer having one input coupled to said first buffer, another input coupled to said second bus and an output;
an N-stage first-in-first-out FIFO memory, where N is an integer greater than 1, said FIFO memory having an input coupled to said output of said first multiplexer and an output;
a second multiplexer having one input coupled to said output of said FIFO memory, another input coupled to said first buffer and an output, said output of said second multiplexer being coupled to said first bus through a third buffer;
said first multiplexer providing floating-point data to said FIFO memory either from said external memory in the event of a cache miss or from said data cache in the event of a cache hit; and
said second multiplexer providing floating-point data to said first bus either from said FIFO memory, or directly from said first buffer when said FIFO memory is empty.

17. In a processor having a floating-point unit, a data cache and a port to an external memory system, a method for pipelined accessing of floating-point data elements from said external memory, said method being executable by instruction means within said processor, said method comprising the steps of:
(a) issuing an address to a floating-point data element resident within said external memory;
(b) writing a previously addressed floating-point data element from said external memory to a N-stage, first-in-first-out (FIFO) memory, where N is an integer greater than 1, said FIFO memory storing a Nth previously addressed data element;
(c) reading said Nth previously addressed floating-point data element from said FIFO memory to a bus;
(d) transferring said Nth previously addressed floating-point element from said bus to a data latch within said floating-point unit.

18. The method of claim 17 wherein said processor is operable to issue additional addresses to said external memory prior to said writing step.

19. The apparatus of claim 16 wherein said second multiplexer provides the Nth previously addressed floating-point data element to said first bus.

20. The apparatus of claim 19 wherein said processor may continue to issue new addresses to said external memory while bus cycles on said external bus remain outstanding.

21. The apparatus of claim 20 wherein said processor waits for outstanding bus cycles on said external bus to be completed before returning said floating-point data from said data cache to said FIFO memory in the event of a cache hit.

* * * * *

UNITED STATES PATENT AND TRADEMARK OFFICE
CERTIFICATE OF CORRECTION

PATENT NO. : 5,155,816
DATED : October 13, 1992
INVENTOR(S) : Kohn

It is certified that error appears in the above-indentified patent and that said Letters Patent is hereby corrected as shown below:

Col. 10, Line 49    Delete "clock-"    Insert --clocks--
Col. 10, Line 50    Delete "s"

Signed and Sealed this

Fifth Day of April, 1994

Attest:

BRUCE LEHMAN

Attesting Officer    Commissioner of Patents and Trademarks